US011898314B2

(12) United States Patent
Carrier et al.

(10) Patent No.: US 11,898,314 B2
(45) Date of Patent: Feb. 13, 2024

(54) SUPPORT DEVICE COMPRISING A POST

(71) Applicant: VALMONT FRANCE, Charmeil (FR)

(72) Inventors: Pascal Jacques Carrier, Surat (FR); David Souchon, Bulhon (FR)

(73) Assignee: VALMONT FRANCE, Charmeil (FR)

( * ) Notice: Subject to any disclaimer, the term of this patent is extended or adjusted under 35 U.S.C. 154(b) by 563 days.

(21) Appl. No.: 17/257,674

(22) PCT Filed: Jul. 5, 2019

(86) PCT No.: PCT/FR2019/051669
§ 371 (c)(1),
(2) Date: Jan. 4, 2021

(87) PCT Pub. No.: WO2020/008155
PCT Pub. Date: Jan. 9, 2020

(65) Prior Publication Data

US 2021/0317623 A1 Oct. 14, 2021

(30) Foreign Application Priority Data

Jul. 5, 2018 (FR) ...................................... 1856179

(51) Int. Cl.
*E01F 9/681* (2016.01)
*E04H 12/08* (2006.01)
(Continued)

(52) U.S. Cl.
CPC ............ *E01F 9/681* (2016.02); *E04H 12/08* (2013.01); *F21S 8/085* (2013.01); *F21W 2131/103* (2013.01)

(58) Field of Classification Search
CPC .. H02G 3/0437; H02G 3/0456; H02G 3/0462; H02G 3/0493; E01F 9/681;
(Continued)

(56) References Cited

U.S. PATENT DOCUMENTS 1,609,874 A * 12/1926 Heydon .............. E04H 12/2292 138/172
2,420,715 A 5/1947 Millward
(Continued)

FOREIGN PATENT DOCUMENTS

CA 2337549 A1 * 8/2001 .............. E01F 9/681
CN 114110508 A * 3/2022 ............ F21V 23/003
(Continued)

OTHER PUBLICATIONS

International Search Report issued on International Application PCT/FR2019/051669, dated Oct. 23, 2019, 6 pages, together with English translation.

*Primary Examiner* — Taylor Morris
(74) *Attorney, Agent, or Firm* — Leber IP Law; Celia H. Leber

(57) ABSTRACT

Support device intended to be installed on public roads, comprising a support post, characterized in that said post has a cross-section comprising a first and a second branch, the support device further comprising:

- a first intermediate element which is separate from said post and designed to be secured thereto and
- a first element for covering said post, which is designed to be fastened between said first and second branches, said first intermediate element and covering element being provided with a complementary first attachment element and a complementary second attachment element, respectively, in order to secure said first covering element to said post, the first and second attachment elements being arranged so that said first covering element, when it is secured to said post, conceals said first intermediate element.

Support device comprising a post, for example, for supporting tramway catenaries.

20 Claims, 5 Drawing Sheets

(51) Int. Cl.
*F21S 8/08* (2006.01)
*F21W 131/103* (2006.01)

(58) Field of Classification Search
CPC ............... E01F 15/141; E01F 15/0469; F21W 2131/103; E04H 17/006; E04H 12/2292; E04H 12/003; E04H 12/08; E04F 13/0736; E04F 2201/0107; F21V 15/01; F21S 8/085
USPC ............................................................ 52/834
See application file for complete search history.

(56) References Cited

U.S. PATENT DOCUMENTS

| | | | | | |
|---|---|---|---|---|---|
| 4,647,713 | A * | 3/1987 | de Nijs | H02G 15/117 174/92 |
| 4,981,005 | A * | 1/1991 | McGinnis | E04H 12/08 228/178 |
| 6,374,548 | B1 * | 4/2002 | Ruedinger | H02G 3/0493 52/36.1 |
| 7,851,702 | B2 * | 12/2010 | Fournier | H02G 3/081 174/559 |
| 7,886,492 | B2 * | 2/2011 | Kelly | E04H 12/2261 52/297 |
| 7,934,851 | B1 * | 5/2011 | Boissevain | F21V 29/74 362/249.02 |
| 8,593,370 | B2 * | 11/2013 | Caldwell | H01Q 1/1242 343/890 |
| 10,815,662 | B1 * | 10/2020 | Smith | E04B 9/225 |
| 11,365,554 | B2 * | 6/2022 | Chia | E04H 12/003 |
| 2007/0044424 | A1 | 3/2007 | Goldsworthy et al. | |
| 2016/0251844 | A1 * | 9/2016 | Allen | E04H 9/021 52/834 |
| 2020/0103085 | A1 * | 4/2020 | Chia | E04H 12/003 |
| 2021/0246680 | A1 * | 8/2021 | Chia | E04C 3/36 |

FOREIGN PATENT DOCUMENTS

| | | | | |
|---|---|---|---|---|
| DE | 102005063234 | A1 | 6/2007 | |
| EP | 1743991 | A2 * | 1/2007 | E04H 12/02 |
| EP | 2873911 | A1 * | 5/2015 | F21S 8/081 |
| GB | 2544459 | A | 5/2017 | |
| KR | 200438242 | Y1 | 1/2008 | |
| KR | 20080093194 | A * | 10/2008 | F21V 21/10 |
| KR | 20110004048 | A * | 7/2009 | E01F 9/60 |
| KR | 20100027486 | A * | 3/2010 | F21S 8/085 |
| KR | 20100039125 | A * | 4/2010 | E04H 12/09 |
| KR | 200455468 | Y1 | 9/2011 | |
| KR | 101140316 | B1 * | 2/2012 | F21K 9/66 |
| WO | WO-2018231147 | A1 * | 12/2018 | E04C 3/36 |
| WO | WO-2019161451 | A1 * | 8/2019 | E04H 12/003 |
| WO | WO-2021253085 | A1 * | 12/2021 | E04H 12/2276 |

* cited by examiner

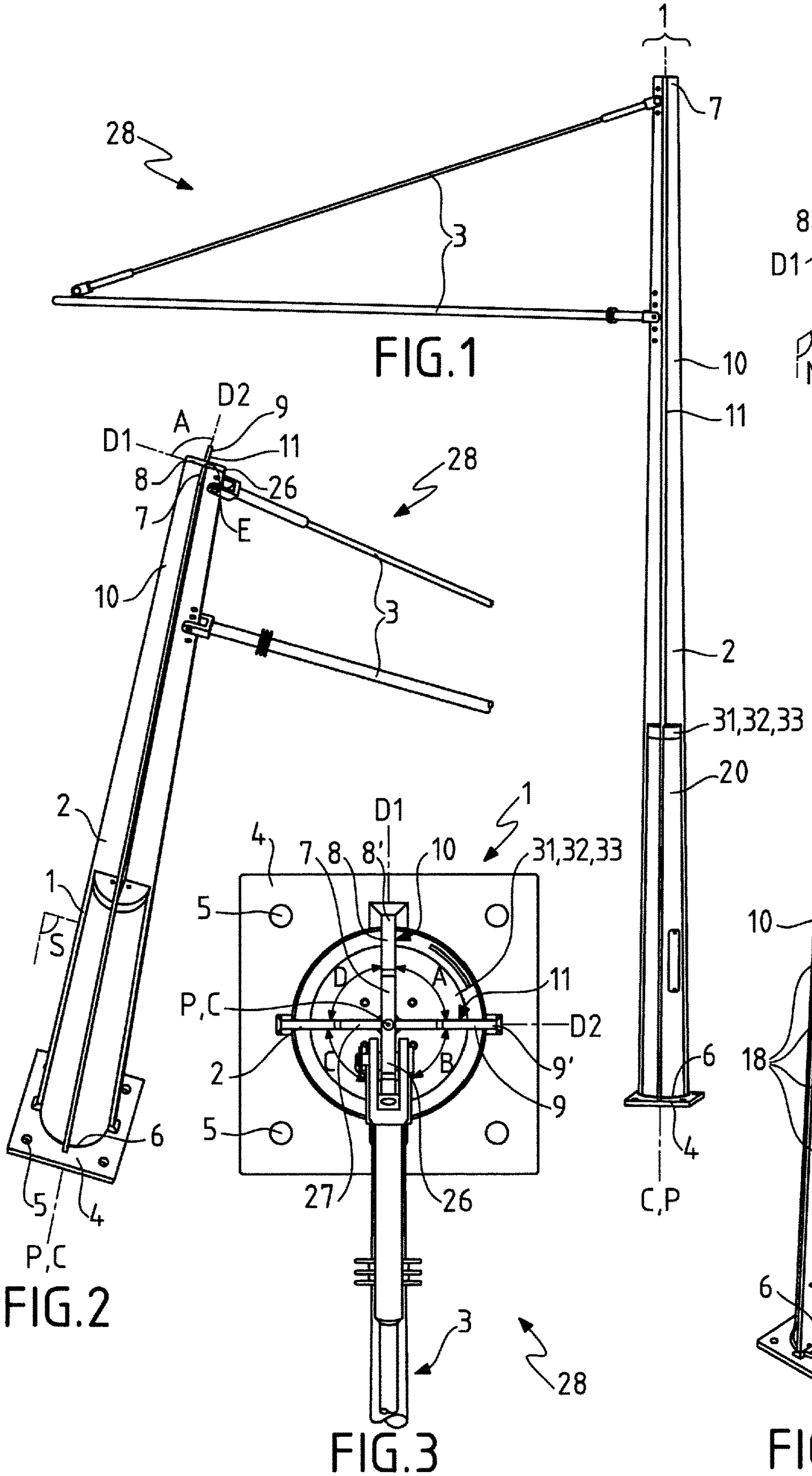
FIG.1
FIG.2
FIG.3
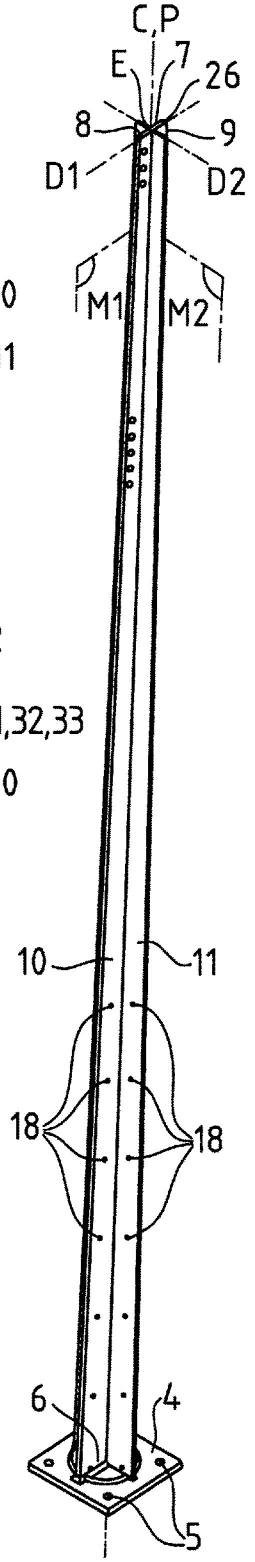
FIG.4

FIG.8
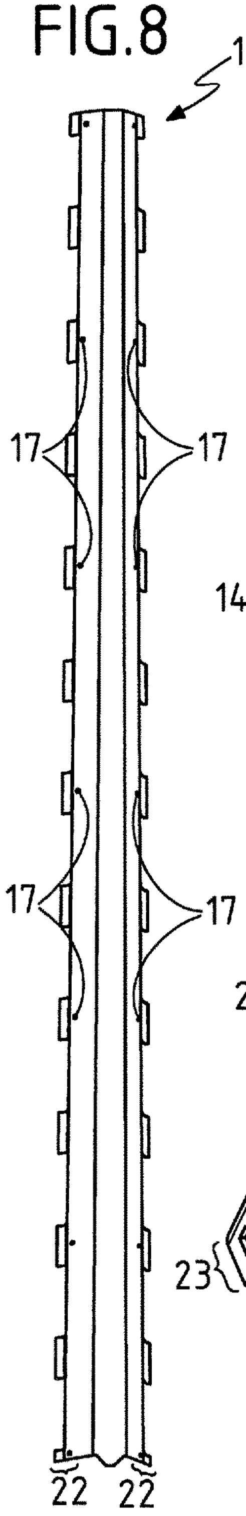
FIG.9
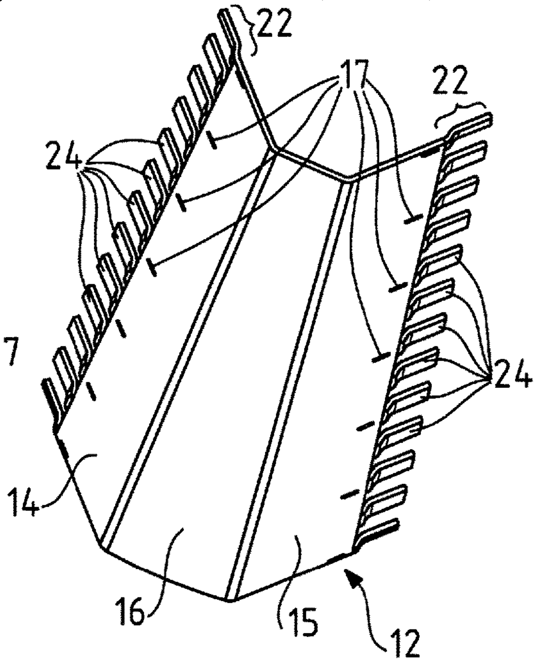
FIG.10
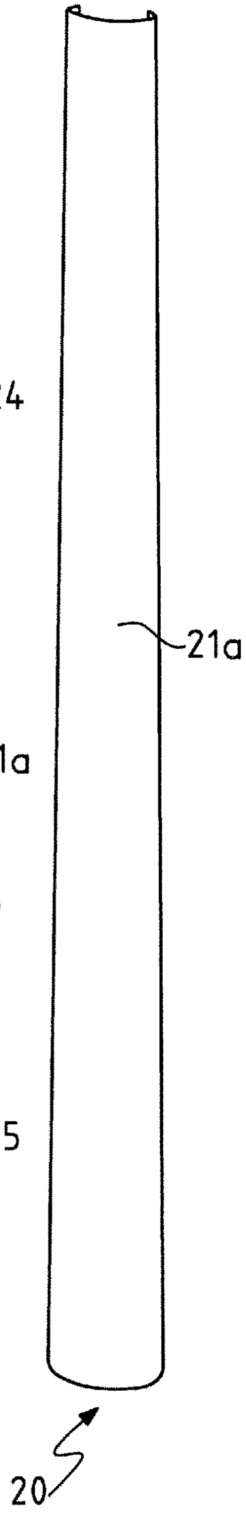
FIG.11
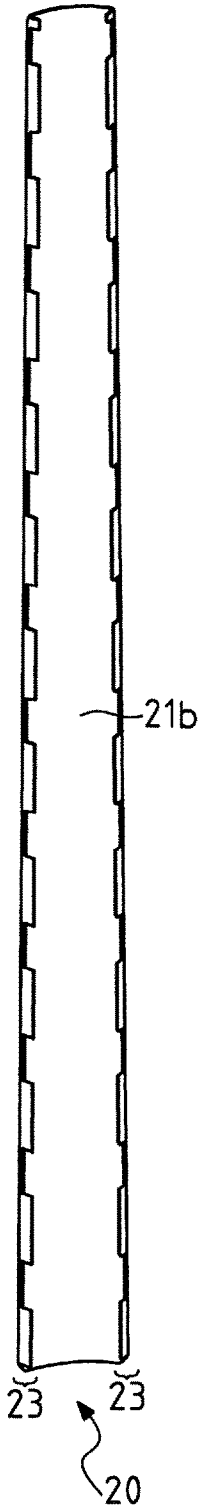
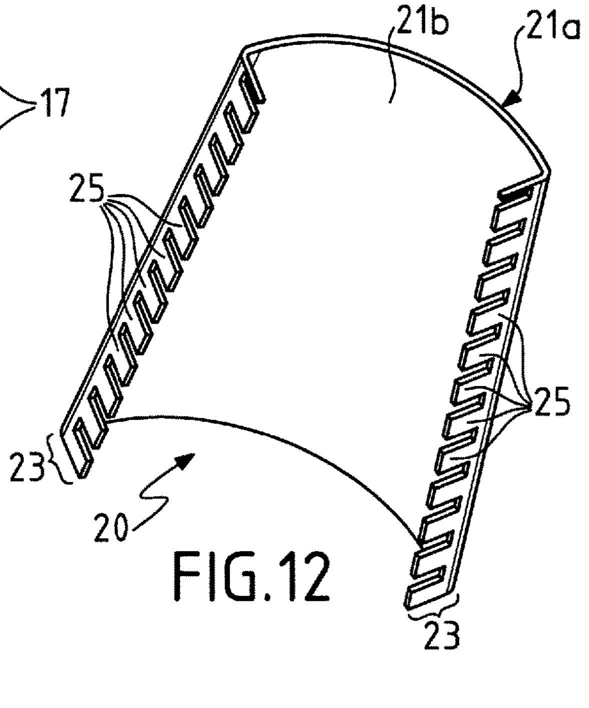
FIG.12

SUPPORT DEVICE COMPRISING A POST

TECHNICAL FIELD

The present invention relates to the general field of posts and mats intended to be implanted on public roads, in particular in urban areas, for supporting equipment such as public lighting devices, public transportation catenaries, urban signalling devices, or also urban billboard devices, for example.

More particularly, the invention relates to a support device intended to be installed on public roads, comprising at least one post for catenary support, and/or public lighting support, and/or urban signalling support, and/or urban billboard support, said post being designed to be bound to the ground via a base so as to extend substantially vertically.

The invention also relates to a set of urban furniture comprising such a support device.

The invention moreover relates to a method for manufacturing a support device intended to be installed on public roads, said method comprising at least a step of making or providing a post for catenary support, and/or public lighting support, and/or urban signalling support, and/or urban billboard support, said post being designed to be bound to the ground via a base so as to extend substantially vertically.

PRIOR ART

It is well known to implement vertical posts intended to support elements of urban furniture. It is for example known to use tubular posts for supporting public lighting devices. These tubular posts, of particularly simple design, are easy and cheap to manufacture, and have a significant mechanical strength, in particular to bending. It is also known to implement, for supporting tramway power supply catenaries, posts formed of solid, H-shaped cross-section, metal beams, which have a particularly high mechanical strength.

These known posts are wholly satisfying but nevertheless suffer from some drawbacks.

Actually, these known posts are mainly, or even only, designed with regard to their practical use and in particular their robustness, as well as their simplicity of manufacture, nevertheless to the detriment of their aesthetical appearance. These known support posts indeed generally have a very basic appearance, which does not facilitate their harmonious visual integration into the urban environment. In particular, these known posts are not customisable, and hence often have a same, rather commonplace and non-adaptable physiognomy, whether it is, for example, with respect to the surrounding landscape or to the period of the year.

There hence exists a need for the visual integration of support posts into the urban environment, as well as a need for customization or differentiation of the external appearance of these posts, and more generally a need for adaptability of the aesthetics of these posts according to various parameters, while preserving their functionality and robustness.

DISCLOSURE OF THE INVENTION

Thus, the objects assigned to the present invention aim to remedy the different above-mentioned drawbacks and to propose a new support device whose external appearance can be easily adapted to be provided with a custom aesthetics, while being of extremely simple, robust and functional construction.

Another object of the invention aims to propose a new support device whose general design allows it to have a new and particularly original aesthetic appearance.

Another object of the invention aims to propose a new support device whose general design makes it possible to control the visual integration thereof into a specific environment, in particular an urban environment.

Another object of the invention aims to propose a new support device that can be rapidly and simply assembled and disassembled, while having a good resistance to vandalism.

Another object of the invention aims to propose a new support device which is cheap and easy to manufacture.

Another object of the invention aims to propose a new support device whose design allows an easy adaption thereof for supporting functional elements of various nature.

Another object of the invention aims to propose a new support device whose design allows it to adopt a great number of different external conformations.

Another object of the invention aims to propose a new support device having both a limited weight and a high strength.

Another object of the invention aims to propose a new support device whose general look is easy to modify and individualize.

Another object of the invention aims to propose a new set of urban furniture whose external appearance is easily customizable according to a great number of possible configurations, while having an excellent mechanical strength.

Another object of the invention aims to propose a method for manufacturing a support device that is easy, rapid and cheap to implement, while making it possible to customize at will the external appearance of the support device.

The objects assigned to the invention are achieved by means of a support device intended to be installed on public roads, comprising at least one post for catenary support, and/or public lighting support, and/or urban signalling support, and/or urban billboard support, said post being designed to be bound to the ground via a base so as to extend substantially vertically, characterized in that said post has, over at least a substantial portion of its length, a cross-section having itself at least a first and a second branch that are solid and that form a first salient angle, and in that the support device further comprises at least:

- a first intermediate element, which is distinct from said post and intended to be secured to the latter on the side of said first salient angle, and
- a first element for covering said post, intended to be added between said first and second branches, on the side of the first salient angle,
  - said first intermediate element and covering element being provided with a first and a second attachment element, respectively, complementary to each other, in order to secure said first covering element to said post, the first and second attachment elements being arranged so that said first covering element, when secured to said post, conceals substantially fully said first intermediate element, said first and second attachment elements having a first set of teeth and a second set of teeth respectively, said first and second sets of teeth being arranged so that said first intermediate element and covering element can move between:
    - an interpenetration position, in which the respective teeth of each of the two sets of teeth are matched with respective spaces separating the respective teeth of the other of the two sets of teeth, and a mechanical interlocking position, in which the respective teeth of each of the two sets of teeth are matched with the respective teeth of the other of the two sets of teeth to secure said first covering element to said post.

The objects assigned to the invention are also achieved by means of a set of urban furniture comprising a support device as defined hereinabove and a public lighting element, and/or a catenary element, and/or an urban signalling element, and/or an urban billboard element.

The objects assigned to the invention are further achieved by means of a method for manufacturing a support device intended to be installed on public roads, said method comprising at least a step of making or providing a post for catenary support, and/or public lighting support, and/or urban signalling support, and/or urban billboard support, said post being designed to be bound to the ground via a base so as to extend substantially vertically, said method being characterized in that said post has, over at least a substantial portion of its length, a cross-section having itself at least a first and a second branch that are solid and that form a first salient angle, and in that it further comprises:

a step of securing to said post, on the side of said salient angle, a first intermediate element, which is distinct from said post and provided with a first attachment element, and a step of covering said post, in which:

(i) a first covering element is added between said first and second branches on the side of the first salient angle, said first covering element being distinct from said first intermediate element and said post, and provided with a second attachment element, and (ii) said first and second attachment elements are attached to each other in a complementary manner to secure said first covering element to said post, the first and second attachment elements being arranged so that said first covering element, when secured to said post, conceals substantially fully said first intermediate element, said first and second attachment element having a first set of teeth and a second set of teeth, respectively, said covering step comprising:

a first matching sub-step, in which the respective teeth of each of the two sets of teeth are matched with respective spaces separating the respective teeth of the other of the two sets of teeth, an interpenetration sub-step, in which the first covering element is displaced towards the first intermediate element so that the respective teeth of each of the two sets of teeth interpenetrate each other, a mechanical interlocking sub-step, in which the respective teeth of each of the two sets of teeth are matched with the respective teeth of the other of the two sets of teeth to secure said first covering element to said post.

BRIEF DESCRIPTION OF THE DRAWINGS

Other objects and advantages of the invention will appear in more detail upon reading of the following description, with reference to the appended drawings, given by way of purely illustrative and non-limitative examples, in which:

FIG. 1 is a perspective view of a support device according to an embodiment of the invention, the device being connected to a catenary or catenary element, the whole forming a set of urban furniture according to a particular embodiment of the invention.

FIG. 2 is a perspective view of a part of the set of urban furniture of FIG. 1, from another point of view, the catenary element being represented only partially.

FIG. 3 is a top view of the set of urban furniture of FIG. 2.

FIG. 4 is a perspective view of a post and the base thereof, in accordance with the support device of the preceding figures.

FIG. 8 is a perspective view of an intermediate element, alone, in accordance with the support device of FIG. 1.

FIG. 9 is a perspective view, from another point of view, of the intermediate element of the preceding figure.

FIG. 10 is a perspective view, from a point of view located towards the outside of the post, of a covering element, alone, in accordance with the support device of FIG. 1.

FIG. 11 is a perspective view, from a point of view located towards the inside of the post, of the intermediate element of the preceding figure.

FIG. 12 is a perspective view, from another point of view located towards the inside of the post, of the intermediate element of the preceding figure.

FIG. 16*a* is a cross-sectional view of the support device of FIG. 1, whereas

Figure 5:
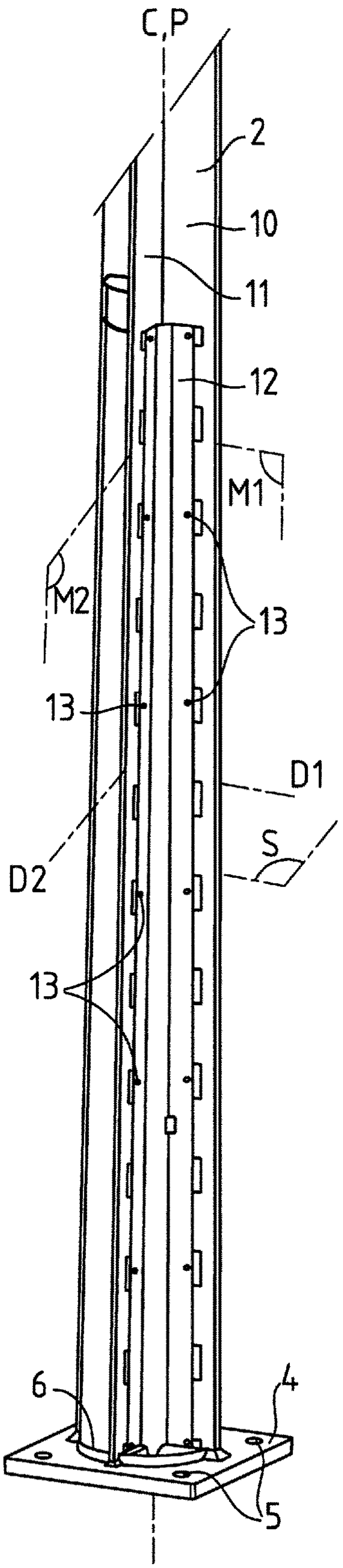
FIG. 5 is a perspective view of the base and a lower portion of the post of the preceding figure, as well as an intermediate element secured to the post in accordance with the embodiment of FIG. 1.
Figure 6:
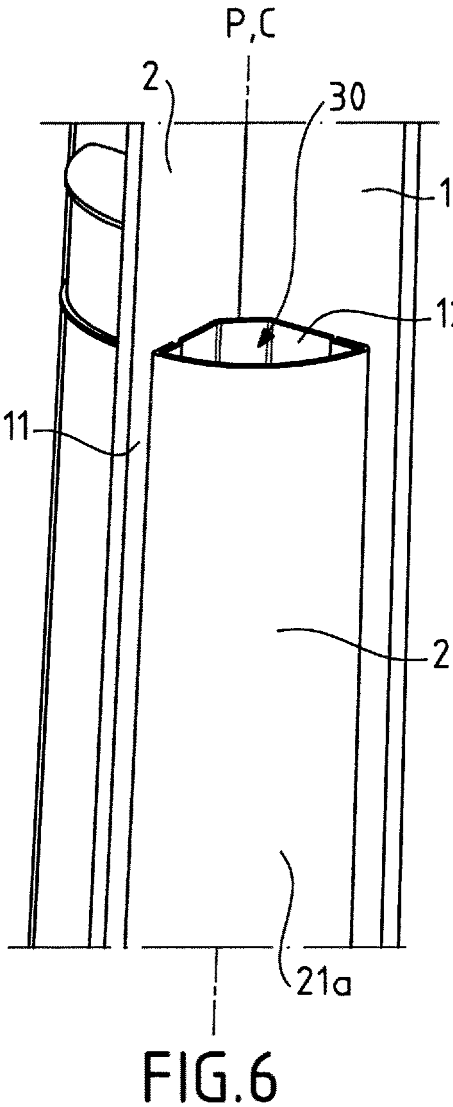
FIG. 6 is a perspective view of a portion of the post and the intermediate element of the preceding figure, as well as a covering element secured to the post, hence forming a support device according to an embodiment of the invention in accordance with FIG. 1.

As illustrated in the figures, the invention relates to a support device 1 intended to support at least one functional and/or decorative element of urban furniture, and more particularly to support one or several of the following elements:

a catenary, or catenary element, such as an electrical cable or wire, a public lighting element, such as a street lighting lamp,

- an urban signalling element, such as a road sign or a red light,
- an urban billboard element, such as a public event or advertising billboard.

Best Way of Making the Invention

According to the invention, the support device 1 is intended to be installed on public roads. In other words, although this is not totally excluded by the invention, the support device 1 is preferably not intended to be installed in a private home or in a fully private space, i.e. a place in which the public services (for example, territorial, municipal, departmental services, etc.) do not usually step in. The support device 1 is for example intended to be installed in a place at the initiative of national, territorial, municipal or departmental organisations, in particular in a street, on a pavement or on a public place, preferentially along a tramway or trolleybus track, or along a road, a motorway, a railway. Optionally, the support device 1 can be intended to be installed in very diverse places, as for example in the mountains, on a ski run, in a particular case where the support device 1 would be provided to support a ski lift system such as a chairlift, cable car or ski tow system.

Still according to the invention, the support device 1 comprises at least one post 2 for public lighting support, and/or catenary 3 support, and/or urban signalling support, and/or urban billboard support. In the preferential embodiment shown in FIGS. 1-3, said post 2 is advantageously intended to be installed on public roads, and designed to support and/or hang a catenary 3 or a catenary element 3, i.e. a wire or wire network intended to supply a collective transport vehicle such as a train, a tramway, a trolleybus, with power, in particular electricity. Advantageously, the term "support" herein also refers to the cases in which said post 2 is intended to hang an element, for example a catenary 3 or a catenary element 3. To simplify the present description, the terms "catenary" or "catenary element" may be considered as being interchangeable. Said catenary element 3 may be formed by a catenary itself, a catenary network or any other element for the connection to a catenary. Of course, a catenary 3 or a catenary wire network 3 may comprise different supports, hanging arms or sheaths in addition to the electrical wires themselves.

According to another particular example, the post 2 is intended for the public lighting support, and advantageously forms a street lamp post, whose functional element is a public light element, and in particular a arm supporting a lamp intended to light the ground.

According to another particular example, the post 2 is intended for the urban signalling support or the urban billboard support, and then advantageously forms an urban (road, rail, pedestrian . . . ) signalling post, intended in particular to support a road sign, or an urban billboard post, intended in particular to support a billboard (for advertising, events, information . . . ).

Generally, the post 2 is preferentially substantially elongated, and hence extends in particular along a main direction of extent P. Of course, the post 2 has advantageously a length that is far greater than its other dimensions (width and thickness), and in particular at least five times greater, preferentially at least ten times greater, and still more preferentially at least fifteen times greater or even twenty times greater than its width and its thickness. Preferentially, the post 2 has a high bending strength, and in any case sufficient to serve as a support for the different above-mentioned elements to be supported (catenary or catenary element, public lighting, urban signalling and urban billboard). Said post 2 has for example a length of about 2 metres, preferably at least 3 metres, possibly at least 5 metres, or even at least 7 metres.

Said post 2 is designed to be connected to the ground via a base 4 so as to extend substantially vertically, preferably along said main direction of extent P. The latter is hence advantageously substantially vertical when said post 2 is installed. Preferably, said base 4 is connected to the ground, for example by screwing with anchoring elements (not shown) made integral with the ground, said base 4 having in particular, as illustrated in FIGS. 2-5, 7 and 16*a*, through-orifices 5 intended for the passage of screws for fastening the post 2 to the ground, which is for example formed of a roadway, a station platform, tramway, train or trolleybus track surroundings, a pavement, a public place, a street, a road or a motorway or the surroundings thereof, etc.

Thus, preferentially, the post 2 rises vertically once installed, and comprises a bottom end 6 intended to be positioned at the lowest altitude of the post 2, and hence near the ground, in the latter or in rest against the latter, and an upper end 7 intended to be positioned at the highest altitude of the post 2. The upper end 7 may be left free, or be provided with a catenary element, a public lighting element, an urban signalling element, and/or an urban billboard element.

As illustrated in FIGS. 1-5, 7 and 16*a*, the base 4 preferably comprises a support plate, for example of rectangular, square or also round shape, and is provided with means for receiving the lower end 6 of the post 2 and for anchoring the latter into the ground. More generally, the base 4 advantageously ensures the fastening of the post 2 to the ground, for example via the lower end 6 of the post 2. The base 4 can be distinct from the post 2, or it may be a part of the latter, or even be single-piece with the latter. As an alternative, the base 4 comprises or is formed by a part of the ground to which the post is 2 is directly fastened, for example, in a particular case in which the post 2 would be driven into the ground. Hence, optionally, said support device 1 comprises said base 4.

According to the invention, as illustrated in the figures and more particularly visible in FIGS. 3, 5, 15 and 16*a*, said post 2 has, over at least a substantial portion of its length, a cross-section S itself comprising at least a first and a second branch 8, 9, that are solid and that form a first salient angle A. Thus, advantageously, said first and second branches 8, 9 extend along a significant part of the post 2, for example over at least one quarter, preferably at least one third, more preferentially over at least the half, or also more preferentially over substantially the totality of the length of said post 2. Said first and second branches 8, 9 advantageously extend along a first and a second direction of extent D1, D2, respectively, which intersect each other at one point E, to form the angle A of the side of the point E to which said first and second branches 8, 9 extend. Advantageously, said first and second branches 8, 9 extend along a respective segment of said first and second directions of extent D1, D2, respectively, and on either side thereof. Said first and second directions of extent D1, D2 are preferentially neither merged with each other nor parallel to each other.

The first salient angle A is hence advantageously obtuse, right or acute, and in the embodiment shown in the figures, the first salient angle A is right, i.e. substantially equal to 90°.

Preferentially, said post 2 comprises at least a first and a second panel 10, 11, which are substantially planar, elongated and intended to be positioned substantially vertically, the first and second panels 10, 11 having respectively a first and a second cross-section forming said first and second branch 8, 9, respectively. The first and second panels 10, 11 advantageously each have a quadrilateral shape, preferentially a trapezoid shape, as illustrated, as well as a high mechanical strength, in particular to bending, said first and second panels 10, 11 being advantageously intended to form the frame of the post 2, i.e. the main structure of the latter ensuring the mechanical strength thereof. According to a first embodiment of the invention, as illustrated in the figures, the first and second panels 10, 11 meet each other (i.e. are fastened to each other) directly at an edge or a common junction area, in particular by welding or screwing to each other. According to another embodiment (not illustrated), the first and second panels 10, 11 meet each other (i.e. are fastened to each other) via a fastening part, in particular by welding or screwing of the latter.

Such a configuration, comprising at least said first and second branches 8, 9, and still more advantageously at least said first and second panels 10, 11, provides the structure of the post 2 with an excellent mechanical strength, in particular to bending, i.e. to the forces directed against the post that are substantially perpendicular to the main direction of extent P of the post 2. Such a configuration hence provides the post 2 with an excellent solidity, allowing the latter to durably ensure its main function of public lighting support, catenary 3 support, urban signalling support and/or urban billboard support, whatever are the external conditions and the weight of the different elements to be supported (lamp for public street lighting, catenary network, etc.).

Preferentially, said first and second panels 10, 11 extend along a first and a second mean plane M1, M2, respectively, said first and second means planes M1, M2 being secant according to said first salient angle A. Preferentially, the first and second directions of extent D1, D2 are respectively inscribed in the first and second mean planes M1, M2, which are advantageously secant along a straight line C, which may optionally, as illustrated in the figures, be merged with said main direction of extent P, or be parallel to the latter. The first and second mean planes M1, M2, are hence preferably neither merged with each other nor parallel to each other.

According to the invention, the support device further comprises at least one intermediate element 12, which is distinct from said post 2 and intended to be secured to the latter on the side of said first salient angle A. The first intermediate element 12 is hence designed to be secured to said post 2, and more particularly the first intermediate element 12 is intended to be added between said first and second branches 8, 9, on the side of the first salient angle A, against one and/or the other of said two branches 8, 9, or more precisely between said first and second panels 10, 11, against either one of said two panels 10, 11, on the side of the first salient angle A.

Advantageously, when the first covering element 20 (which will be detailed hereinafter) is secured to said post 2, said first intermediate element 12 and covering element 20 extend along a significant portion of the length of the post 2, for example about one quarter, or one third, of the latter.

Hence, the support device 1 advantageously further comprises at least one securing element 13 for securing said first intermediate element 12 to said post 2, and still more advantageously to at least one of said first and second panels 10, 11.

Preferably, said first intermediate element 12 is formed of a substantially rigid material, and comprises for example, as illustrated in the figures, at least one sheet of rigid material, substantially elongated and substantially curved, folded or assembled so as to fit the first salient angle A and to follow said first and second branches 8, 9.

The first intermediate element 12 is made for example of wood or plastique, and more advantageously metal.

For example, as illustrated in FIGS. 5, 6, 8, 9, and 13-16*a*, the first intermediate element 12 is substantially elongated and has a substantially U-shaped cross-section, the first intermediate element 12 comprising a first and a second wing 14, 15 each forming a respective side of the U-shape. Said U-shape has preferably non-parallel sides, which diverge from each other. Advantageously, said first and second wings 14, 15 are formed by a primary panel and a secondary panel, respectively, intended to be applied against said first and second branches 8, 9, respectively. Preferably, said first and second wings 14, 15, and more preferentially, said primary and secondary panels, are intended to be attached to said first and second panels 10, 11, and/or said first and second branches 8, 9, respectively. Also advantageously, the first intermediate element 12 further comprises a central panel 16 that forms the core of the U-shape and attaches said first and second wings 14, 15 to each other, and more precisely said primary and secondary panels to each other. Preferably, said first and second wings 14, 15 extend from a first and second opposite edges of the central panel 16, respectively, said first and second wings 14, 15 being for example divergent from each other. Said first and second wings 14, 15 are advantageously designed to fit the general shape of the post 2, more particularly so as to be able to be secured to the post 2 on the side of said first salient angle A between the first and second branches 8, 9 and/or between said first and second panels 10, 11. Said first and second wings 14, 15 preferably form an angle between each other, and more particularly an angle equal to the first salient angle A, for example a right angle. According to a particular example, as illustrated, said first and second wings 14, 15, and more precisely said primary and secondary panels, each form an obtuse angle with the central panel 16.

Preferentially, the first intermediate element 12 is intended to be at least partly applied against one of said first and second panels 10, 11, and in particular against a face of at least one of them, in particular by screwing. More precisely, said first and second wings 14, 15 are intended to be applied against said first and second panels 10, 11, respectively, and fastened to these latter, respectively, in particular by screwing, for example by means of a set of connection bolts 19.

Thus, the securing element 13 is for example formed by:
- on the one hand, a first and a second set of through-holes 17, 18 provided in said first intermediate element 12 and said post 2 (and more precisely in said first and second wings 14, 15), respectively, said first and second sets of through-holes 17, 18 being intended to be matched with each other,
- on the other hand, a set of bolts 19 for connecting the first intermediate element 12 to the post 2, and more precisely for connecting said first and second wings 14, 15 to said first and second panels 10, 11, the connection screws 19 being intended to pass through said first and second sets of through-holes 17, 18.

Advantageously, the set of connection bolts 19 comprises a plurality of screws and bolts corresponding to these latter.

Preferably, said first intermediate element 12 is reversibly secured to said post 2, as this is in particular the case when the securing element 13 comprises the set of connection bolts 19 as described hereinabove. In other words, said securing element 13 is advantageously designed to be easily removed so as to separate the first intermediate element 12 from said post 2 (and more precisely from said first intermediate element 12). As an alternative, said first intermediate element 12 is substantially irreversibly secured to said post 2, for example by welding.

Still according to the invention, the support device 1 further comprises at least one first covering element 20 of said post 2, intended to be added between said first and second branches 8, 9, on the side of the first salient angle A. More precisely, said first covering element 20 is advantageously intended to be added, that is to say positioned and secured, between said first and second panels 10, 11, on the side of said first salient angle A. As illustrated in the figures, and more particular visible in FIGS. 12 to 14, said first covering element 20 preferably comprises at least one substantially elongated covering sheet or plate made of a substantially rigid material, said covering sheet or plate being slightly folded or curved along its length (that is to say parallelly to the length of the covering sheet or plate), for example like a longitudinal portion of cylinder or a portion of cylinder cut along the height of the latter, and/or for example in order to form an angle and in particular a right angle (embodiment not shown). Preferentially, said covering sheet or plate has a substantially curved cross-section, which has in particular the shape of an arc of a circle, as well seen in particular in FIGS. 10 to 12. Nevertheless, said covering sheet or plate, and more generally the first covering element 20, may have a great variety of shapes according to the chosen covering, that is to say the external appearance or the decoration that is desired to be given to the post 2, or rather with which the post 2 is covered. For example, said covering sheet or plate can have the shape of a longitudinal part forming an elongated curved surface, a little like a longitudinal portion of a pipe of circular or elliptic cross-section (as illustrated in particular in FIG. 1), or a corner (in particular at right angle), a little like a stair step or a longitudinal portion of a pipe of square or rectangular cross-section, whose right angle would be positioned in particular opposite the first salient angle A. Said first covering element 20 is preferably distinct from said post 2 and said first intermediate element 12. Said first intermediate element 12 is preferentially located between said post 2 and said first covering element 20, hence advantageously occupying an "intermediate" position between said post 2 and said first covering element 20.

Preferentially, said first intermediate element 12 and/or said first covering element 20 is(are) substantially fully in an angular volume delimited by said first and second mean planes M1, M2 on the side of said first salient angle A.

According to the invention, said first intermediate element 12 and covering element 20 are provided with a first and a second attachment element 22, 23, respectively, complementary to each other, in order to secure said first covering element 20 to said post 2. In other words, advantageously, said first intermediate element 12 comprises or is equipped with the first attachment element 22, said first covering element 20 comprises or is equipped with the second attachment element 23, the first and second attachment elements 22, 23 being designed so that they can be matched together in order to attach said first covering element 20 to said post 2, and more advantageously to said intermediate element 12. Indeed, said first covering element 20 is preferentially fastened to said post 2 at least partly via said first intermediate element 12.

Figure 7:
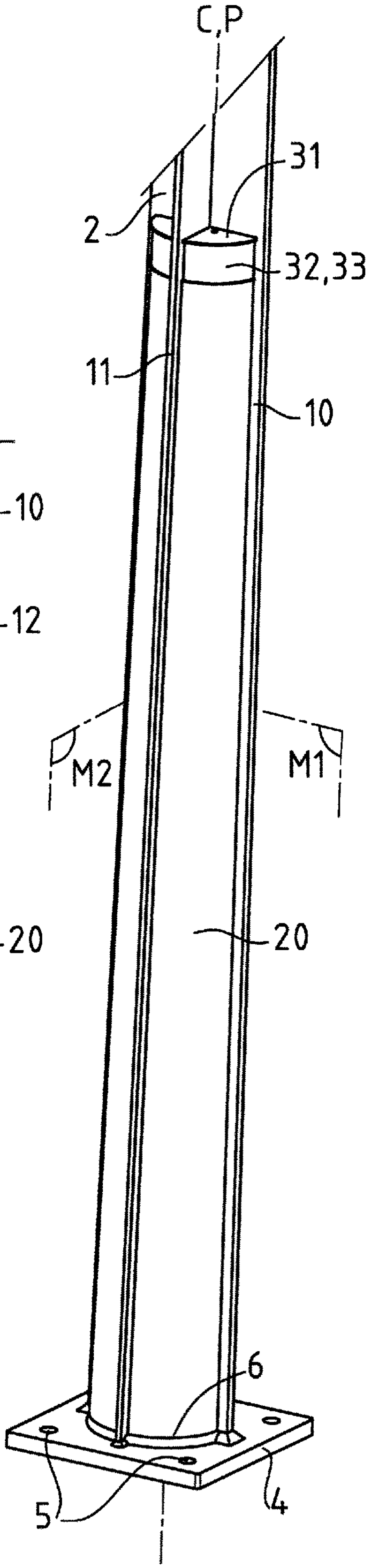
FIG. 7 is a perspective view of the support device of the preceding figure, in a more complete view including the base of FIGS. 1 to 5, the device being now provided with a beacon at the top of the intermediate element and covering element, in accordance with the embodiment of FIG. 1.

As illustrated in the figures, and more particularly in FIGS. 1, 2 and 7, the first and second attachment elements 22, 23 are arranged so that said first covering element 20, when secured to said post 2, conceals substantially fully said first intermediate element 12.

This configuration is particularly advantageous as regards the aesthetics of the support device 1, in that it allows hiding the first intermediate element 12 from the outside, said first intermediate element 12 preferably forming the main means for securing the first covering element 20 to the post 2. Hence, the first covering element 20, when secured to the post 2, advantageously covers the first intermediate element 12 so as to conceal substantially fully the latter, in particular with respect to the a human watching from the outside, for example a passer-by, a pedestrian, a cyclist, a traveller on a tramway station platform, etc., who would be near the support device 1.

Advantageously, the first covering element 20 (and more precisely the covering sheet or plate thereof) has an outer face 21*a*, intended to be visible when the first covering element 20 is secured to the post 2, and an inner face 21*b*, that is not visible when the first covering element 20 is secured to the post 2. Hence, the first covering element 20, and more precisely the outer face 21*a* thereof, can have a customizable outer appearance, allowing the users to decorate, individualize and modify the aesthetics of the support device 1 over at least a length portion of the latter, i.e. advantageously of the post 2.

Advantageously, said first and second attachment elements 22, 23 are designed to be reversibly attached to each other. That way, it is advantageously possible to easily detach, i.e. separate, without great effort, the first covering element 20 from said post 2, and still more advantageously from said first intermediate element 12. This allows the support device 1 to have a modular design particularly easy to adapt to the environment and/or according to the choices of the users, who may, for example, decide to regularly replace a first covering element 20 of a first type having a first pattern on its outer face 21*a* by a first covering element 20 of a second type having a second pattern on its outer face 21*a*, and that, in particular, without having to disassemble the first intermediate element 12, which preferably adapts to several types of covering elements 20, to successively secure them to said post 2. The other advantage of this modular design is that it makes it possible to modify at will and easily the physiognomy, the general look of the part of the post 2 to which the first covering element 20 is secured, and that, without having to change the structural part of the support device 1, and in particular without having to remove the post 2 from the ground, which would require significant efforts due to its mass that, even if it is limited thanks to the invention, remains in principle relatively substantial, and in any case generally far more important than the first covering element 20.

The support device 1 of the invention hence allows, advantageously, to cover, in particular successively, the post 2 with covering elements 20 of different configurations. Moreover, advantageously, the support device 1 makes it possible to adapt a very wide variety of covering elements 20 to the post 2 thanks to the intermediate element 12 that is itself intended to be reversibly secured to the post 2, and that may hence be also changed at will by a user, said intermediate element hence ideally having a wide variety of different configurations perfectly adapted to fasten to said post 2 covering elements 20 themselves of different configurations. Preferably, said first covering element 20 is reversibly secured to said post 2, via said first intermediate element 12, said first covering element 20 being preferentially secured to said first intermediate element 12, itself reversibly. In other words, said first covering element 20 is advantageously designed to be easily disassembled so as to be separated from said post 2, or more precisely from said first intermediate element 12 (when the latter is secured to said post 2).

Advantageously, said first covering element 20, when secured to the post 2, conceals substantially fully said securing element 13, which is for example formed by said set of connection bolts 19 and said first and second sets of through-holes 17, 18.

Preferably, said first and second attachment elements 22, 23 are designed to be attached to each other by interlocking. Thus, advantageously, said first and second attachment elements 22, 23 are designed to be mechanically adapted, adjusted to each other, so as to make a connection fastening the first covering element 20 to the post 2, and more advantageously to the intermediate element 12.

Figure 13:
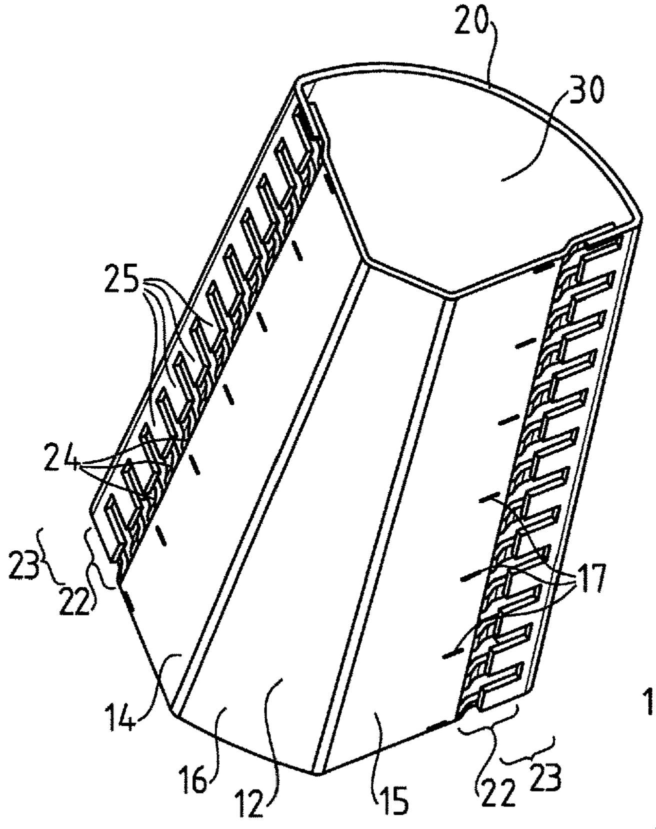
FIG. 13 is a perspective view of the intermediate element and covering element of FIGS. 8 to 12, taken alone, in a configuration in which the covering element is secured to the post (not shown), in accordance with the embodiment of FIG. 1.
Figure 14:
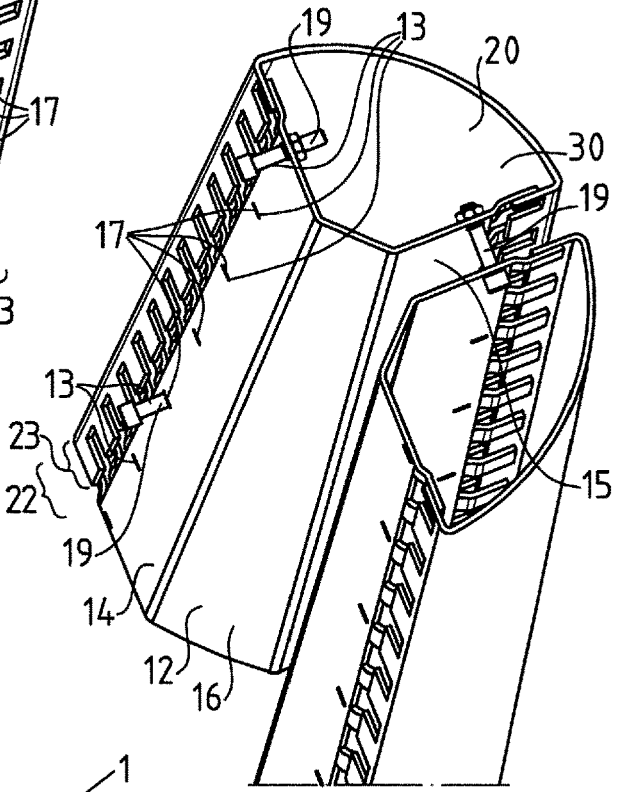
FIG. 14 is a perspective view of the intermediate element and covering element of the preceding figure with, in addition, another intermediate element and another covering element, in a configuration in which the covering elements are secured to the post (not shown) and in which the intermediate elements are connected to each other, in accordance with the embodiment of FIG. 1.
Figure 15:
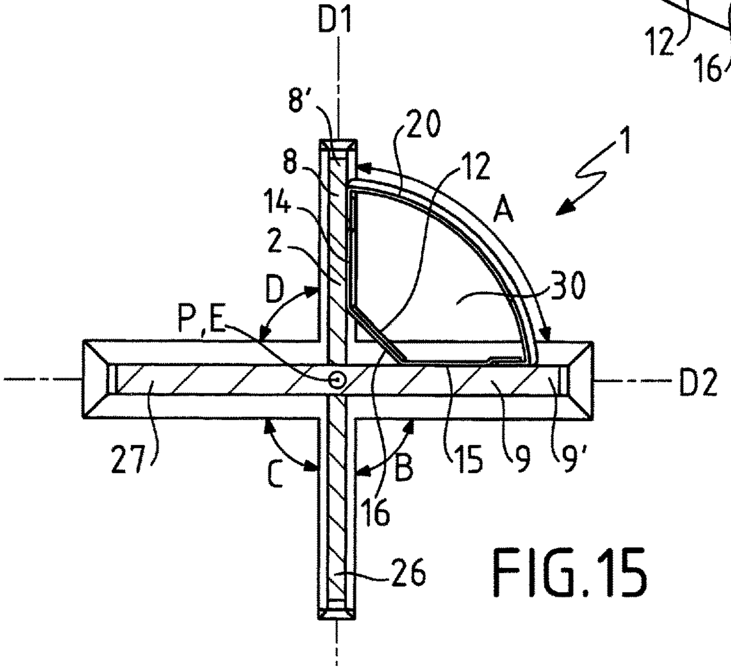
FIG. 15 is a cross-sectional top view of the support device in accordance with the preceding figures and, in particular, FIGS. 1-3 and 6-7, and in which only one covering element and one intermediate element secured to a post on the side of a same salient angle are visible.

According to a particular embodiment notably illustrated in FIGS. 9, 13 and 14, said first attachment element 22 is an integral part of said first intermediate element 12. For example, said first attachment element 22 is formed single-piece with the intermediate element 12 (or more exactly with the rest of said first intermediate element 12), and notably with said first and second wings 14, 15. In other words, according to this latter example, said first attachment element 22 is integral with the intermediate element 12 (or more precisely with the rest of the first intermediate element 12).

Preferably, said first covering element 20 comprises a central body to which is attached, on either side of the latter, the second set of teeth 25 (which will be described in more detail hereinafter), as illustrated in particular in FIG. 12. According to a particular embodiment, notably illustrated in FIGS. 12, 13 and 14, said second attachment element 23 is an integral part of said first covering element 20. For example, said second attachment element 23 is formed single-piece with said first covering element 20 (or more precisely with the rest of said first covering element 20), and in particular with said central body. In other words, according to this latter example, said second attachment element 23 is single-piece with the first covering element 20 (or more exactly the rest of the first covering element 20).

Such a configuration, in which said first and second attachment elements 22, 23 are single-piece with said first intermediate element 12 and said first covering element 20, respectively, is particularly advantageous because it allows reinforcing the general strength of said support device 1, while simplifying its making and in particular the manufacturing method (described in more detail hereinafter).

According to the invention, said first and second attachment elements 22, 23 have a first set of teeth 24 and a second set of teeth 25, respectively, said first and second sets of teeth 24, 25 being arranged so that said first intermediate element 12 and covering element 20 can move between:

- an interpenetration position (not shown), in which the respective teeth of each of the two sets of teeth 24, 25 are matched with respective spaces separating the respective teeth of the other of the two sets of teeth 24, 25, and
- a mechanical interlocking position, as illustrated in FIG. 6, 13-16*b*, in which the respective teeth of each of the two sets of teeth 24, 25 are matched with the respective teeth of the other of the two sets of teeth 24, 25 to secure said first covering element 20 to said post 2. The mechanical interlocking position actually advantageously corresponds to a position of securing of the first covering element 20 to the post 2.

The interpenetration position can for example correspond to a position of matching of the first intermediate element 12 of FIG. 9 with the first covering element 20 of FIG. 12, the respective teeth of the first and second sets of teeth 24, 25 being opposite or crisscross with the respective spaces separating the respective teeth of the other of said two sets of teeth 24, 25.

Hence, the interpenetration position corresponds to a positioning of the first intermediate element 12 and covering element 20, which were previously remote from each other, in which the teeth of the first set of teeth 24 are passed through spaces located between the teeth of the second set of teeth 25, whereas the teeth of the second set of teeth 25 are passed through spaces located between the teeth of the first set of teeth 24.

Preferentially, in the interpenetration position and/or the mechanical interlocking position, the teeth of the first set of teeth 24 are aligned with respect to each other, and are parallel to the teeth of the second set of teeth 25, which are also aligned with each other.

Advantageously, when the intermediate element 12 and covering element are secured to the post 2, the respective teeth of the first and second sets of teeth 24, 25 are projections, to the outside of the post 2, of the first intermediate element 12 and the first covering element 20, respectively.

The first set of teeth 24 can be an integral part of the first intermediate element 12, or added thereto, whereas the second set of teeth 25 can be an integral part of the first covering element 20, or added thereto.

By way of illustration only, it may be said that, in practice, to secure the first covering element 20 to said post 2, the first covering element 20 is added towards said first intermediate element 12, itself already secured to the post 2, so that the teeth of the first and second sets of teeth 24, 25 interpenetrate, i.e. intersect, each other at said interpenetration position, then, so that they go beyond each other, i.e. penetrate more deeply into the spaces located between the teeth, the first and second attachment elements 22, 23 being then fully imbricated into each other. The first covering element 20 is then, for example, slightly moved downward so as to put again the respective teeth of the first and second sets of teeth 24, 25 is spatial matching with each other, hence securing the first covering element 20 to said post 2 because the teeth of each set of teeth 24, 25 are held by those of the other set of teeth 24, 25. It is then advantageously possible to separate the first covering element 20 of the post 2, or more precisely of the first intermediate element 12, by lifting the covering element 20 (and hence the teeth of the second set of teeth 25) upward, so that the respective teeth of the two sets of teeth 24, 25 are no longer in spatial matching, then pulling the first covering element 20 apart from the post 2 so that the respective teeth of the two sets of teeth 24, 25 are no longer in interpenetration.

Advantageously, in mechanical interlocking position, the teeth of the first set of teeth 24 (and hence, herein, of the first intermediate element 12) extend towards the outside of the post 2, whereas the teeth of the second set of teeth 24 (and hence, herein, of the first covering element 20) extend towards the inside of the post 2. For example, as illustrated in FIGS. 8 and 9, when the intermediate element 12 is secured to the post 2, the teeth of the first set of teeth 24 form projections from respective edges of said first and second wings 14, 15 in the continuation of these latter, towards the outside of the post 2, whereas, when the covering element 20 is secured to the post 2, the teeth of the second set of teeth 25 form projections from edges of said covering sheet or plate, towards the inside of the post 2, by forming for example a right or acute angle with the immediate edge of said covering sheet or plate.

Preferably, said first covering element 20, when secured to the post 2, conceals substantially fully said first attachment element 22. Preferably, said first covering element 20, when secured to the post 2, conceals substantially fully said second attachment element 23.

Such a configuration advantageously allows the support device 1 to show an aesthetics that is congruent, controlled and almost fully customizable, non-dependent on the appearance of the different securing functional elements (attachment elements 22, 23, intermediate element 12, etc.). Moreover, such a configuration further makes it possible to conceal, over at least a significant portion of the length of the post 2, the edge or the junction area of the first and second panels 10, 11, or also the potential fastening portion of these two panels 10, 11, and in particular the potential welds made to fasten said first and second 10, 11 to each other. In other words, said first and second panels 10, 11 have advantageously a fastening area or portion, which comprises for example welds, and which is concealed over a significant portion of the length of the post 2 by said first covering element 20. In other words, such a configuration makes it possible to advantageously conceal the purely structural or construction aspects of the post 2 or more generally of the support device 1, in order to leave almost only the visible aesthetic aspect of the outer face 21*a* (except the first and second protruding ends 8', 9' described hereinafter).

Advantageously, the cross-section S of said post 2 varies along the height of the latter. In other words, the cross-section of said post 2 preferentially has a surface that varies according to the considered altitude (or height) of the post 2. Preferentially, the variation of the cross-section S of said post 2 is progressive. Thus, the cross-section of said post 2 has in particular a surface that varies progressively with the altitude or height of the post 2.

Preferably, the cross-section of said post 2 increases from the top to the bottom of the post 2. In other words, the cross-section S of said post 2 preferentially has a surface that increases when the altitude of the post 2 decreases. Advantageously, the respective lengths of said first and second branches 8, 9 increase from the top to the bottom of the post 2. In other words, advantageously, the first branch 8 has, at first height of the post 2, a first length, and at a second height of the post 2, a second length, said first length being higher than said second length when said first height is lower than said second height, the same remarks applying, mutatis mutandis, to the second branch 9.

Such a configuration makes it possible to provide the post 2 and hence the support device 2 an optimum mechanical strength, while guaranteeing a limited mass due to the upward sharpness of the post 2. Moreover, this conformation advantageously makes it possible to position in a more visible manner the first intermediate element 12 and covering element 20 at a lower portion of the post 2, because this lower portion is in practice wider. Hence, this reduction of the cross-section when the height of the post 2 rises not only allows said post 2 to have a limited mass, but to also show an aesthetics which is emphasized on the lowest portion of the post, which is thicker, accessible, visible (for the pedestrians, passers-by, travellers, etc.) and above all provided with the first intermediate element 12 and covering element 20.

Preferentially, the first and second attachment elements 22, 23 are arranged so that, when the first covering element 20 is secured to said post 2, the first and second branches 8, 9 have a first and a second protruding end 8', 9', respectively, said first and second protruding ends 8', 9' each projecting towards the outside of the post 2 beyond the first covering element 20, preferably so as to stay visible, hence providing the support device 1 with an element that is both aesthetic, herein the distinctive side of these protruding ends 8', 9', and functional, the extension of each branch 8, 9 meaning a mechanical reinforcement of the post 2.

Advantageously, and as illustrated in the figures, said first intermediate element 12 and/or said first attachment element 20 each have a respective cross-section that varies in the same way as the cross-section S of the post 2, and in particular, that increases from the top to the bottom with respect to the post 2, when said first attachment element 20 is secured to the post 2.

Preferably, when the first covering element 20 is secured to said post 2, i.e. in particular in mechanical interlocking position, at least a part of the covering element 20 and/or of the second attachment element 23 is applied against the post 2 by the intermediate element 12 and/or said first attachment element 22, at least a part of the covering element 20 and/or of the second attachment element 23 being hence advantageously squeezed between the post 2 on the one hand and the intermediate element 12 and/or said first attachment element 22 on the other hand. More preferentially, in mechanical interlocking position, the teeth of the second set of teeth 25 are applied against the post 2, and more precisely against the first and second panels 10, 11, by the teeth of the first set of teeth 24, said teeth of the second set of teeth 25 being hence advantageously squeezed between the post 2 (and more precisely said first panel 10 and/or said second panel 11) and the teeth of the first set of teeth 24 with which they are respectively in spatial matching. Preferentially, the securing element 13, and more particularly the set of connection bolts 19, makes it possible to tighten the first intermediate element 12 against the post 2, and hence participate to the squeezing or tightening of the teeth of the second set of teeth 25 between the post 2 and the teeth of the first set of teeth 24.

Figure 16A:
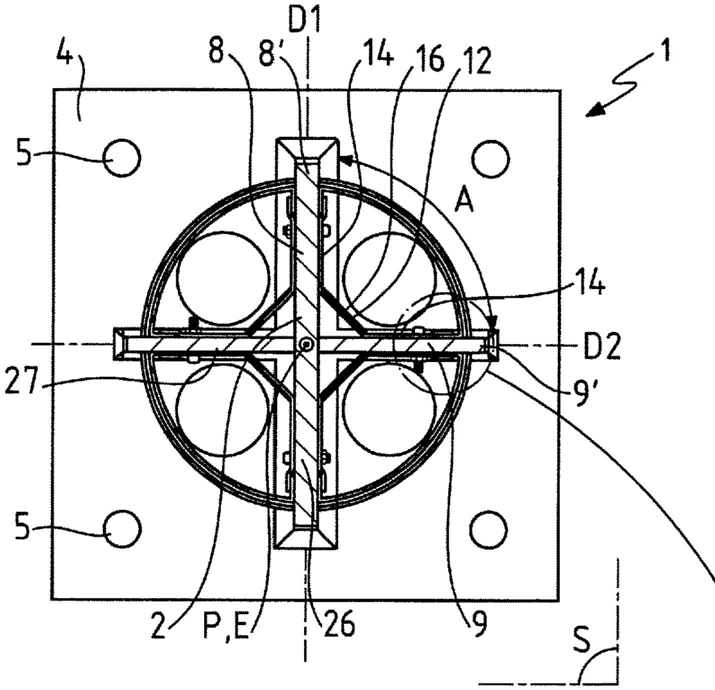
Figure 16B:
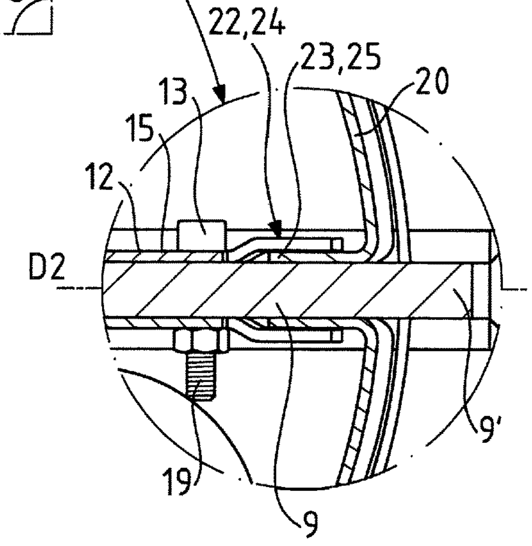
FIG. 16*b* is an enlarged view of a detail of FIG. 16*a* showing in particular the first and second interlocking attachment means.

As particularly well illustrated in FIG. 16*b*, such a configuration is advantageous because it makes it possible to firmly hold the second attachment element 22, and more precisely the teeth of the second set of teeth 25, in mechanical interlocking with the first attachment element 23, and more precisely with the teeth of the second set of teeth 25. Indeed, the teeth of the second set of teeth 25 are squeezed in position against the post 2, and more precisely against the panels 10, 11, by the teeth of the first set of teeth 24. In other words, the above-mentioned mechanical interlocking is preferably difficult or even impossible to remove without previously removing the above-mentioned tightening of squeezing of the teeth of the second set of teeth 25, for example by unscrewing the set of connection bolts 19. This constitutes an additional security for avoiding that acts of vandalism modify the arrangement of the support device 1, for example by tearing the first covering element 20, which is made extremely difficult thanks, firstly, to the above-mentioned mechanical interlocking, and secondly, to the tightening or squeezing of the teeth of the second set of teeth 25, as described hereinabove.

Preferably, said first intermediate element 12 and covering element 20 define, when the first covering element 20 is secured to said post 2, an inner space 30 in which can for example pass sheathes, electrical wires, and in particular electrical wires for powering the public lighting. The inner space 30 has preferentially a continuous elongated shape along the post 2, with a lower end near the ground and closed by the base 4 and/or the ground, and an opposite, upper end, which is advantageously closed, at least partly or even fully, by at least one closing element 31. The latter makes in possible, in particular, to prevent a too easy and/or evident access to the inner space 30, hence reducing the risk of vandalism, i.e. of voluntary degradation of the support device 1.

Figure 17:
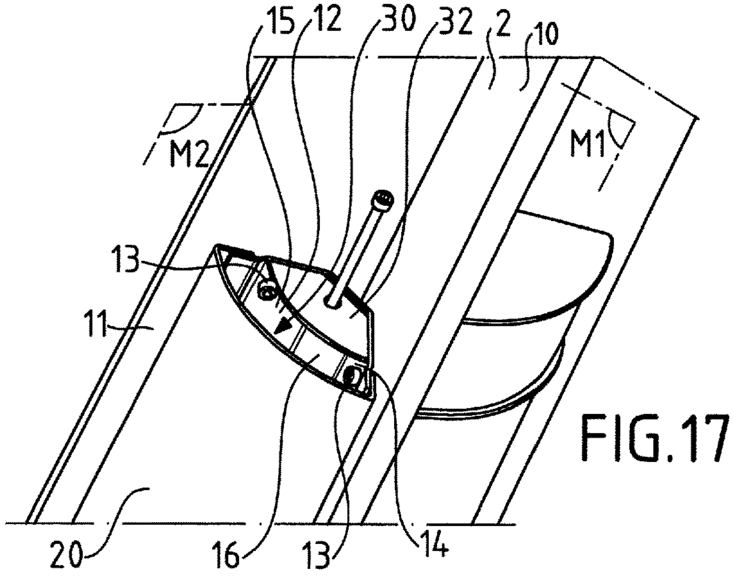
FIG. 17 is a perspective view from a different angle of the support device of FIG. 6, to which has been added a element for closing the inner space.

For example, the support device 1 comprises an additional functional element 32 that is intended to equip said post 2, more particularly at the upper end thereof. Said additional functional element 32 comprises for example a public lighting element, such as a street lamp element (not illustrated), or an urban signalling element, such as a luminous beacon 33, as illustrated in FIG. 17. Advantageously, the additional functional element 32 forms a part of the closing element 31, or the reverse, and comes in particular "on top" of the first intermediate element 12 and covering element 20 when the latter is secured to the post 2, as illustrated in FIGS. 1-3 and 7. In particular, said additional functional element 32 may have a function that is fully different from the main function for which the support device 1 is provided, which is, for example, a support device 1 for a catenary 3, whereas the additional functional element 32 is an urban signalling element of such as a luminous beacon 33 or an urban lighting element such as a street lamp.

Advantageously, the support device 1 comprises supply elements positioned within the inner space 30 to power supply, and in particular with electricity, a functional element such as the additional functional element 32, a public lighting element, an urban signalling element, or even a catenary, etc.

According to another example, the additional functional element 32 comprises at least one light means positioned inside the inner space 30, whereas the first covering element 20 comprises one or several slots or holes letting through a part of the light produced by the light means, so that the support device 1 has a remarkable aesthetics due to the effect produced by the combination of the luminescence of the light means with one or several slots or holes, which advantageously pass through the first covering element 20 between the upper face 21*a* and the lower face 21*b* thereof.

Hence, the first covering element 20 can have a function of adornment of the post 2, i.e. a decorative function, but also a function of protection of the post 2, and in particular of functional or decorative elements of the support device 1 possibly arranged in the inner space 30, such as for example the light means, sheathes, electrical wires, and in particular the electric wires for powering a catenary, a public lighting (for example, in the case of an additional functional element 32 such as a street lamp) or an urban billboard (for example, in the case of an additional functional element 32 such as a beacon 33). The first covering element 20 hence advantageously constitutes a shell or shell part protecting at least a portion of the post 2 or of functional elements running along the latter, the shell or shell part being located in particular between the first and second branches 8, 9, i.e. between the first and second panels 10, 11, or also in the angular volume. Preferentially, the support device 1 provides for several types of first covering elements 20 each having a different external appearance and/or protective function.

Optionally, the closing element 31 also forms an element for locking the first covering element 20 in position when the latter is secured to said post 2. Preferably, it is indeed necessary to remove at least partially the closing element 31 to detach the first covering element 20 from the post 2. In particular, to remove the mechanical locking of the two sets of teeth 24, 25, it is notably necessary to lift the first covering element upward so that the respective teeth of the two sets of teeth 24, 25 are no longer in spatial matching, which is impossible to do if the closing element 31 is still in place.

Advantageously, said cross-section S of the post 2 has the shape of a four-branch star or a cross (preferably, also with four branches), said first and second branches 8, 9 forming two adjacent branches of said four-branch star or cross shape. Preferably, said shape of a four-branch star or a cross (preferably, also with four branches) is straight, i.e. all its branches form with the adjacent branches right angles, each substantially equal to 90°.

Preferably, said cross-section S of said post 2 has at least one third branch 26 that is solid and that forms a second salient angle B with said second branch 9, said support device 1 further comprising:

- a second intermediate element, which is distinct from said post 2 and intended to be secured to the later on the side of said second salient angle B, and
- a second element for covering said post 2, intended to be added between said third branch 26 and said second branch 9, on the side of the second salient angle B, said second intermediate element and second covering element being provided with a third and a fourth attachment element, respectively, complementary to each other, to secure said second covering element to said post 2, the second and third attachment elements being arranged to that said second covering element, when attached to said post 2, conceals substantially fully said second intermediate element.

Preferably, said cross-section S of said post 2 has at least one fourth branch 27 that is solid and that forms a third salient angle C with the third branch 26, said support device 1 further comprising:

- a third intermediate element, which is distinct from said post 2 and intended to be secured to the latter on the side of said third salient angle C, and
- a third element for covering said post 2, intended to be added between said fourth branch 27 and said third branch 26, on the side of the third salient angle C, said third intermediate element and third covering element being provided with a fifth and a sixth attachment element, respectively, complementary to each other, to secure said third covering element to said post 2, the fifth and sixth attachment elements being arranged so that said third covering element, when secured to said post 2, conceals substantially fully said third intermediate element.

Preferably, said fourth branch 27 forms a fourth salient angle D with said first branch 8, said support device 1 further comprising:

- a fourth intermediate element, which is distinct from said post 2 and intended to be secured to the latter on the side of said fourth salient angle D, and
- a fourth element for covering said post 2, intended to be added between said fourth branch 27 and said first branch 8, on the side of the fourth salient angle D, said fourth intermediate element and fourth covering element being provided with a seventh and an eighth attachment element, respectively, complementary to each other to secure said fourth covering element to said post 2, the seventh and eighth attachment elements being arranged so that said fourth covering element, when secured to said post 2, conceals substantially fully said fourth intermediate element.

Hence, advantageously, said third and fourth branches 26, 27 form two adjacent branches of said shape of four-branch star or cross (preferably, also with four branches), and are symmetric with respect to said first and second branches 8, 9.

Advantageously, the first, second, third and fourth salient angles A, B, C, D are right, i.e. substantially equal to 90°.

Preferentially, the different intermediate elements and covering elements are substantially similar and fulfil the same functions. It is preferably the same for the first and second, third and fourth, fifth and sixth, seventh and eighth attachment elements, taken two by two.

The invention also relates to such a set of urban furniture 28 comprising a support device 1, preferentially as described hereinabove, and a public lighting element, and/or catenary element 3, and/or an urban signalling element, and/or an urban billboard element supported by said support device 1, advantageously also as described hereinabove. The above description relating to the support device 1, the public lighting element, the catenary element 3, the urban signalling element and the urban billboard element hence also applies to the set of urban furniture 28.

The invention also relates as such a method for manufacturing a support device 1, which is preferably as described hereinabove, and, according to the invention, is intended to be installed on public roads, said method comprising at least a step of making or providing a post 2 for public lighting support, and/or catenary 3 support, and/or urban signalling support, and/or urban billboard support, said post 2 being designed to be bound to the ground via a base so as to extend substantially vertically. The above description relating to the support device 1 hence also applies to the manufacturing method.

According to the invention, said post 2 has, over at least a substantial portion of its length, a cross-section S having itself at least a first and a second branch 8, 9 that are solid and that form a first salient angle A. Said post 2 is preferably as described hereinabove, and made of a material having a high mechanical strength, for example wood, concrete, and preferably metal.

Preferably, during said step of making or providing the post 2, at least a first and a second substantially planar, elongated panel 10, 11, intended to be positioned substantially vertically, are made or provided, the first and second panels 10, 11 having respectively a first and a second cross-section forming said first and second branches 8, 9, respectively.

Advantageously, during said step of making or providing the post 2, said first and second panels 11, 12 are fastened to each other by welding and/or screwing, i.e. by means of welds and/or screws.

Still according to the invention, said method further comprises a step of securing to said post 2, on the side of said first salient angle A, a first intermediate element 12 that is distinct from said post 2 and provided with a first attachment element 22. Said first intermediate element 12 is preferably as described hereinabove, and made of a material having a high mechanical strength, for example wood, concrete, and preferably metal.

Preferentially, during said securing step, said first intermediate element is secured to said post 2 by a securing element 13.

Preferably, during said securing step, said first intermediate element 12 is reversibly secured to said post 2.

Advantageously, during said securing step, said first intermediate element 12 is secured to said post 2 by screwing, and in particular using a set of connection bolts 19, as defined hereinabove, the latter then forming at least in part the securing element 13.

According to the invention, said method also comprises a step of covering said post 2, in which:

(i) a first covering element 20 is added between said first and second branches 8, 9 on the side of the first salient angle A, said first covering element 20 being distinct from said first intermediate element 12 and said post 2, and provided with a second attachment element 23, and (ii) said first and second attachment elements 22, 23 are attached to each other in a complementary manner to secure said first covering element 20 to said post 2, the first and second attachment elements 22, 23 being arranged so that said first covering element 20, when secured to said post 2, conceals substantially fully said first intermediate element 12.

Advantageously, said covering step is reversible. Still more advantageously, said method further comprises a step of changing the first covering element 20, in which a first covering element 20 of a first type, which is already secured to the post 2, is detached from the post 2 during a step that is the reverse of the covering step, and a first covering element 20 of a second type is secured to the post 2 during a covering step as mentioned hereinabove.

Said first covering element 20 is preferably as described hereinabove, and made of a material having a high mechanical strength, for example wood, concrete, and preferably metal.

Still more advantageously, the first and second attachment elements 22, 23 are arranged so that said first covering element 20, when secured to said post 2, conceals substantially fully the welds or the screws fastening said first and second panels 11, 12, at least over a portion of the post 2 to which the first covering element 20 is secured.

Advantageously, during the covering step, the first covering element conceals substantially fully said securing element 13.

Preferentially, during said covering step, the first and second attachment elements 22, 23 are attached to each other by mechanical interlocking, the latter being in particular as mentioned hereinabove. The first and second attachment elements 22, 23 are preferably as described hereinabove, and made of a material having a high mechanical strength, for example wood, concrete, and preferably metal.

Advantageously, the mechanical interlocking is made using a first translation of the first covering element 20 towards the first intermediate element 12 along a first direction of translation, then a second translation of the first covering element 20 along a second direction of translation different from the first direction of translation.

In particular, said second direction of translation is substantially parallel to a direction of longitudinal extent of the first intermediate element 12 and/or a direction of longitudinal extend of the first covering element 20. The first direction of translation is for example substantially horizontal, whereas the second direction of translation is substantially vertical or slightly oblique with respect to the vertical.

According to the invention, said first and second attachment elements 22, 23 have a first set of teeth 24 and second set of teeth 25, respectively, and said covering step comprises:

- a first matching sub-step, in which the respective teeth of each of the two sets of teeth 24, 25 are matched with respective spaces separating the respective teeth of the other of the two sets of teeth 24, 25,
- an interpenetration sub-step, in which the first covering element 20 is displaced towards the first intermediate element 12 so that the respective teeth of each of the two sets of teeth 24, 25 interpenetrate each other,
- a mechanical interlocking sub-step, in which the respective teeth of each of the two sets of teeth 24, 25 are matched with the respective teeth of the other of the two sets of teeth 24, 25 to secure said first covering element 20 to said post 2.

Possibilities of Industrial Application

The support device 1 according to the invention, made in particular thanks to the manufacturing method according to the invention, is particularly adapted for supporting tramway catenaries or other elements of urban furniture (urban billboard, signalling, public lighting, etc.) while integrating harmoniously into the environment and having excellent functional (solidity, durability . . . ) and practical (installation, modularity . . . ) qualities.

The invention claimed is:

1. A support device configured to be installed on public roads, comprising at least one post for catenary support and/or public lighting support, and/or urban signalling support, and/or urban billboard support, said post being designed to be bound to the ground via a base so as to extend substantially vertically, characterized in that said post has, over at least a substantial portion of its length, a cross-section having itself at least a first and a second branch that are solid and that form a first salient angle, and in that the support device further comprises at least:

- a first intermediate element, which is distinct from said post and configured to be secured to the post on a side of said first salient angle, and
- a first element for covering said post, which is distinct from said first intermediate element and said post, and configured to be added between said first and second branches, on the side of the first salient angle,
- said first intermediate element and covering element being provided with a first and a second attachment element, respectively, complementary to each other, in order to secure said first covering element to said post, the first and second attachment elements being arranged so that said first covering element, when secured to said post, substantially conceals said first intermediate element, said first and second attachment elements having a first set of teeth and a second set of teeth, respectively, said first and second sets of teeth being arranged so that said first intermediate element and covering element can move between:
  - an interpenetration position, in which the respective teeth of each of the two sets of teeth are matched with respective spaces separating the respective teeth of the other of the two sets of teeth, and
  - a mechanical interlocking position, in which the respective teeth of each of the two sets of teeth are matched with the respective teeth of the other of the two sets of teeth (24, 25) to secure said first covering element to said post.

2. The support device according to claim 1, characterized in that said first covering element, when secured to the post, substantially conceals said first attachment element.

3. The support device according to claim 1, characterized in that said first covering element, when secured to the post, substantially conceals said second attachment element.

4. The support device according to claim 1, characterized in that it further comprises at least one securing element for securing said first intermediate element to said post, and in that said first covering element, when secured to the post, substantially conceals said securing element.

5. The support device according to claim 1, characterized in that said first and second attachment elements are designed to be reversibly attached to each other.

6. The support device according to claim 1, characterized in that said first and second attachment elements are designed to be attached to each other by interlocking.

7. The support device according to claim 1, characterized in that said post comprises at least a first and a second substantially planar, elongated panel, configured to be positioned substantially vertically, the first and second panels having respectively a first and a second cross-section forming said first and second branches, respectively.

8. The support device according to claim 7, characterized in that said first and second panels extend along a first and a second mean plane, respectively, said first and second means planes being inclined relative to each other by said first salient angle.

9. The support device according to claim 8, characterized in that said first intermediate element and/or said first covering element is(are) substantially in an angular volume delimited by said first and second mean planes on the side of said first salient angle.

10. The support device according to claim 1, characterized in that a respective length of each of said first and second branches increase from the top to the bottom of the post.

11. The support device according to claim 1, characterized in that said cross-section of the post has at least one third branch that is solid and that forms a second salient angle with said second branch, said support device further comprising:

- a second intermediate element, which is distinct from said post and configured to be secured to the post on a side of said second salient angle, and
- a second element for covering said post, configured to be added between said third branch and said second branch, on the side of the second salient angle,
- said second intermediate element and second covering element being provided with a third and a fourth attachment element, respectively, which are complementary to each other, in order to secure said second covering element to said post, the third and fourth attachment elements being arranged so that said second covering element, when secured to said post, substantially conceals said second intermediate element.

12. The support device according to claim 1, characterized in that the cross-section of the post has a four-branch-star or cross shape, said first and second branches forming two adjacent branches of said four-branch-star or cross shape.

13. A set of urban furniture comprising the support device according to claim 1 and a public lighting element, and/or a catenary element, and/or an urban signalling element, and/or an urban billboard element supported by said support device.

14. A method for manufacturing a support device configured to be installed on public roads, said method comprising at least a step of making or providing a post for catenary support, and/or public lighting support, and/or urban signalling support, and/or urban billboard support, said post being designed to be bound to the ground via a base so as to extend substantially vertically, said method being characterized in that said post has, over at least a substantial portion of its length, a cross-section having itself at least a first and a second branch that are solid and that form a first salient angle, and in that it further comprises:

- a step of securing to said post, on a side of said first salient angle, a first intermediate element that is distinct from said post and provided with a first attachment element, and a step of covering said post in which a first covering element is added between said first and second branches on the side of the first salient angle, said first covering element being distinct from said first intermediate element and said post, and provided with a second attachment element, and said first and second attachment elements are attached to each other in a complementary manner to secure said first covering element to said post, the first and second attachment elements being arranged so that said first covering element, when secured to said post, substantially conceals said first intermediate element, said first and second attachment elements having a first set of teeth and a second set of teeth respectively, said covering step comprising:

a first matching sub-step, in which the respective teeth of each of the two sets of teeth are matched with respective spaces separating the respective teeth of the other of the two sets of teeth, an interpenetration sub-step, in which the first covering element is displaced towards the first intermediate element so that the respective teeth of each of the two sets of teeth interpenetrate each other, a mechanical interlocking sub-step, in which the respective teeth of each of the two sets of teeth are matched with the respective teeth of the other of the two sets of teeth to secure said first covering element to said post.

15. The manufacturing method according to claim 14, characterized in that, during said step of making or providing the post, at least a first and a second substantially planar, elongated panel, configured to be positioned substantially vertically, are made or provided, the first and second panels having respectively a first and a second cross-section forming said first and second branches, respectively.

16. The manufacturing method according to claim 15, characterized in that, during said step of making or providing the post, said first and second panels are fastened to each other by welding and/or screwing, and in that, during said securing step, said first intermediate element is secured to said post by screwing.

17. The manufacturing method according to claim 14, characterized in that, during said securing step, said first intermediate element is secured to said post by a securing element, and in that, during the covering step, the first covering element substantially conceals said securing element.

18. The manufacturing method according to claim 14, characterized in that, during said covering step, the first and second attachment elements are attached to each other by mechanical interlocking.

19. The manufacturing method according to claim 18, characterized in that the mechanical interlocking is made using a first translation of the first covering element towards the first intermediate element along a first direction of translation, then a second translation of the first covering element along a second direction of translation different from the first direction of translation.

20. The manufacturing method according to claim 19, characterized in that said second direction of translation is substantially parallel to a direction of longitudinal extent of the first intermediate element and/or a direction of longitudinal extent of the first covering element.

* * * * *